United States Patent [19]

Walker

[11] 4,072,987
[45] Feb. 7, 1978

[54] DIGITAL STORAGE SYSTEMS

[75] Inventor: Ian Clive Walker, Newbury, England

[73] Assignee: Micro Consultants Limited, England

[21] Appl. No.: 703,172

[22] Filed: July 7, 1976

Related U.S. Application Data

[63] Continuation-in-part of Ser. No. 670,935, March 26, 1976, Pat. No. 4,045,613.

[30] Foreign Application Priority Data

Mar. 26, 1975 United Kingdom ............... 12607/75

[51] Int. Cl.² .............................................. G11B 5/09
[52] U.S. Cl. .................................................. 360/48
[58] Field of Search ............................. 360/39, 48, 51

[56] References Cited

U.S. PATENT DOCUMENTS

| | | | |
|---|---|---|---|
| 3,387,293 | 6/1968 | Stockebrand | 360/48 |
| 3,399,394 | 8/1968 | Smith | 360/48 |
| 4,001,883 | 1/1977 | Strout et al. | 360/48 |

Primary Examiner—Vincent P. Canney
Attorney, Agent, or Firm—William Anthony Drucker

[57] ABSTRACT

Apparatus for inserting synchronizing data between blocks of serial data and for subsequently retrieving said blocks of data in the correct sequence and at the right point in time. The apparatus for inserting the synchronizing data synchronizing data generating means for producing a predetermined data sequence. Selector means are connected to the data generator and also to an input receiving the serial data for selecting either the serial data or the synchronizing data. Control means are connected to an output of the selector means for producing an identification gap in the serial data before the start of the synchronizing data. The signal produced at an output of the control means comprises a data gap followed by the synchronizing data and the serial data.

The apparatus for retrieving the blocks of serial data from these signals comprises synchronizing data detection means for detecting the predetermined data sequence including the identification gap. Extractor means are provided to separate the data blocks from the synchronizing data. Control means are also provided for controlling the extractor means to inhibit extraction of the data if the synchronizing data detected is of an incorrect sequence.

23 Claims, 4 Drawing Figures

DIGITAL STORAGE SYSTEMS

This is a continuation-in-part application of patent application Ser. No. 670,935 filed Mar. 26, 1976 now U.S. Pat. No. 4,045,613.

BACKGROUND TO THE INVENTION

The invention relates to a method and apparatus for storing and retrieving data on a recording medium. This recording medium could be magnetic tape for example.

It is known to record digital data on magnetic tape from a plurality of analogue sources having first converted the analogue output into digital form. Such a technique is known as data logging and suitable analogue sources could comprise thermocouples acting as temperature sensors.

When storing the data on the recording medium it is necessary to include additional information with the data to allow correct sequencing of the data contained thereon when handled by the machine receiving the retrieved information to ensure that the data is responded to in the correct sequence and at the right point in time.

SUMMARY OF THE INVENTION

According to the invention there is provided apparatus for inserting synchronising data between blocks of serial data, said apparatus comprising synchronising data generating means for producing a predetermined data sequence, selector means connected to said data generator and an input receiving said serial data for selecting either said serial data or said synchronising data, control means connected to an output of said selector means for producing an identification gap in the serial data before the start of the synchronising data whereby the signal produced at an output of said control means comprises a data gap followed by said synchronising data and said serial data.

Further according to the invention there is provided a method of inserting synchronising data between blocks of serial data comprising producing a predetermined synchronising data sequence, selecting either said serial data or said synchronising data, and controlling said selected data to produce an identification gap in the data before the start of the synchronising data, which synchronising data is followed by said serial data.

According to a third aspect of the invention there is provided apparatus for retrieving blocks of serial data from data containing synchronising data and comprising:
 (a) synchronising data detection means for detecting a predetermined data sequence including an identification gap;
 (b) extractor means for separating said data blocks from said synchronising data; and
 (c) control means for controlling said extractor means to inhibit extraction of said data if the synchronising data detected is of an incorrect sequence.

According to a fourth aspect of the invention a method of retrieving blocks of serial data from data containing synchronising data comprisiing;
 (a) detecting the presence of said synchronising data including an identification gap;
 (b) extracting the data blocks from said incoming data; and
 (c) controlling said data extraction to ensure that data is extracted only after a predetermined synchronising sequence has been detected.

BRIEF DESCRIPTION OF THE DRAWINGS

The invention will now be described by way of example with reference to the accompanying drawings, in which.

DESCRIPTION OF PREFERRED EMBODIMENTS

Figure 1:
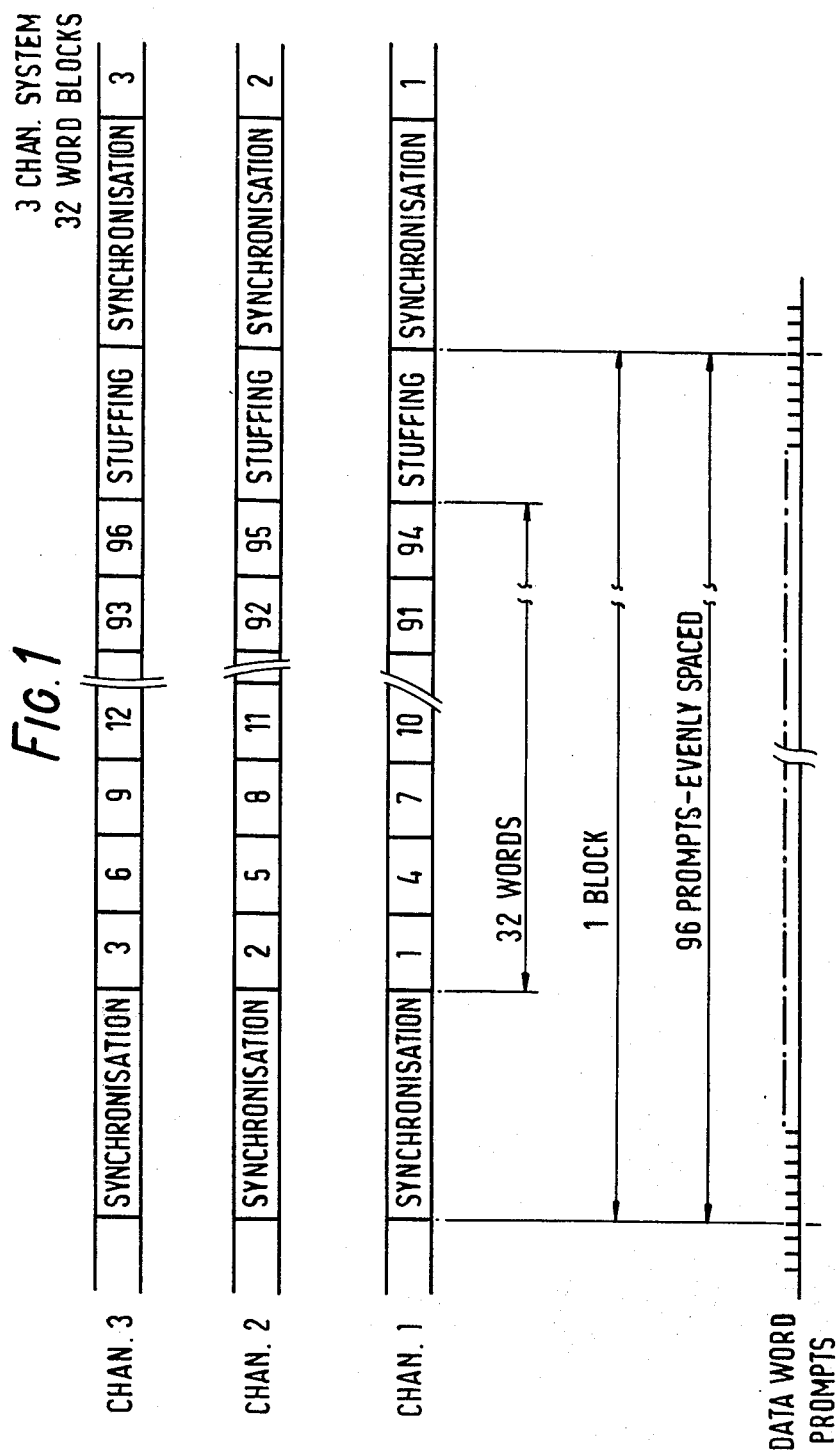
FIG. 1 shows the general data sequence produced by the novel arrangement for a three channel recording medium.

The data format of FIG. 1 is shown as being provided on three channels. This arrangement could be varied to allow the storing and retrieval of data on a recording medium having between one and fourteen channels for example.

The data starts off in bit parallel word serial form and has its origin from a sequential word generator as described below. The rate at which words are generated by this word generator is controlled by a prompting output from the generation system. The design of the system is such that this prompting output is always spaced regularly in time.

There are two modes of operation of the disclosed system. In one mode the system stores 16 bit parallel data words, and in the other mode it stores 24 bit parallel data words.

The data is recorded in words serial, bit serial form. Each word consists of 24 or 16 serial bits of data encoded in Miller code or Delay Modulation form. On each channel of the recording medium the words are grouped in blocks of 32. Between each block of 32 words is a unique synchronisation sequence that allows the data recovery system to recognise the start of a block of 32 words.

When a storage medium having more than one channel is used the unique synchronisation sequence is repeated on all channels at the start of a block. The data words, in serial form, are then distributed in rotation to all channels of the storage medium that are currently in use until 32 data words have been recorded on each channel. The synchronisation sequence is then repeated on all channels prior to the distribution of a further sequence of data words.

In certain cases it may be necessary to provide stuffing bits which are inserted on all channels between the last data word on each channel and the beginning of the synchronisation sequence. These stuffing bits make up the number of bits per block (that is to say the product of the number of bits per word and the number of words per block, plus the number of bits in the synchronisation sequence) so that this total is easily divisible by the number of words recorded on all channels in use per block (that is to say the product of the number of words per block and the number of channels being used to record the data).

Making up the number of bits per block in this way allows the control system to generate a train of regularly timed reference pulses to prompt the words to be recorded out of the word generator.

An important feature of the data format described is that each word is recorded on only one channel of the storage medium. This means that all the data is not lost if one channel of the storage medium fails and it also means that the data is easy to recover if loss of time coincidence occurs between the various channels of the multi channel storage system when the data is replayed for subsequent recovery.

Figure 2:
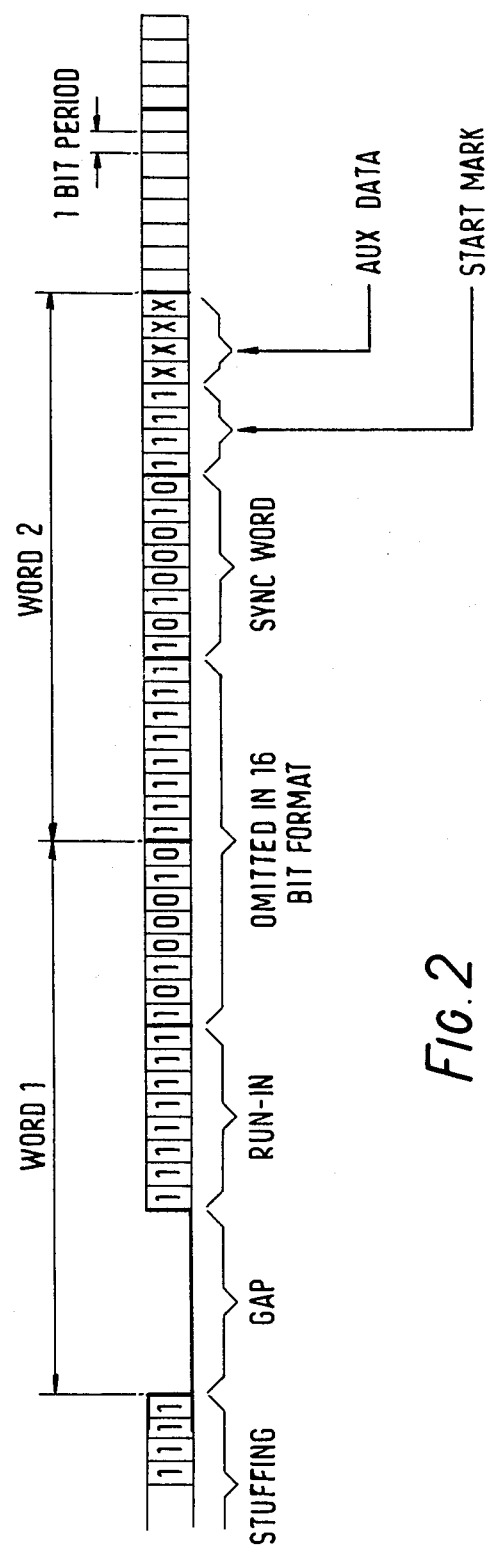
FIG. 2 shows in more detail the novel synchronising sequence.

The synchronisation sequence consists of four distinct sections and is shown in more detail in FIG. 2.
1. Gap
2. Run-in
3. Synchronisation word
4. Start mark and auxiliary data

1. Gap

The gap consists of 8 bit periods during which there are no level changes in the data. With the normal forms of encoding used, that is to say Phase Encoding or Delay Modulation Encoding, there is a maximum number of bit periods that will elapse between changes occurring on the output. The length of the gap is arranged to be in excess of this number.

2. Run-in

This consists of 8 bit periods representing binary one. It is provided to allow the data recovery circuits to synchronise to the bit rate being generated by the replay medium.

3. Synchronisation Word

This consists of the unique binary 10100010. This sequence is designed to have low correlation with any other part of the synchronisation sequence.

4. Start Mark and Auxiliary Data

The first four bits of this section are set to binary one and act as a marker to determine the absolute location of the first bit of the first word of the following data. The remaining four bits of this part of the sequence are used to convey data referring to the previous or subsequent block.

Figure 3:
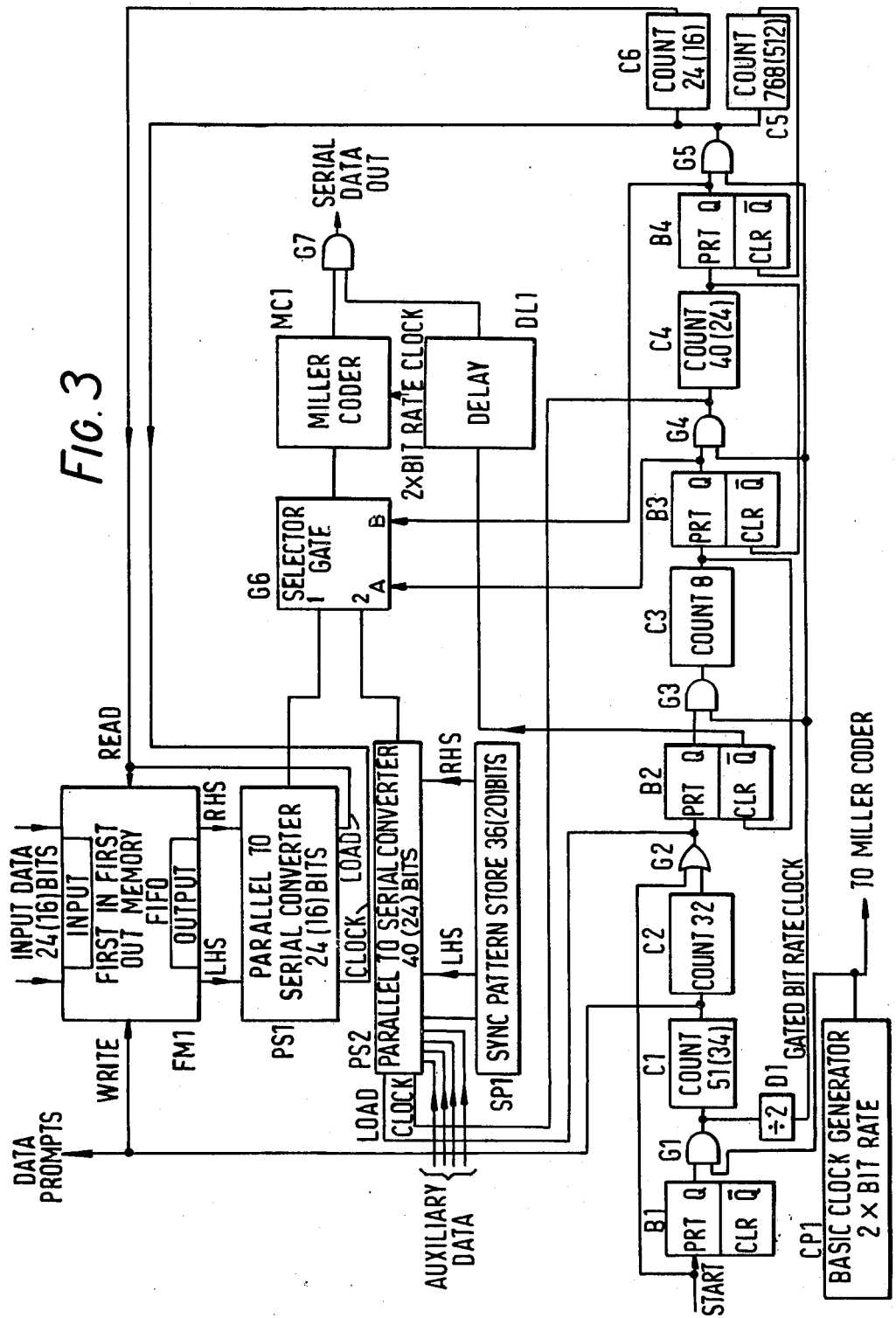
FIG. 3 shows one arrangement for producing the sequence of FIG. 2.

An arrangement for providing the format of FIG. 2 is shown in FIG. 3 and includes an input bistable B1 having its Q output connected to one input of AND gate G1. The other input of G1 receives clock pulses from generator GP1. The output of G1 is received by preset counter C1 which in turn feeds a second preset counter C2. OR gate G2 receives counter C2 output at one of its inputs, the other input being connected to the start input. A further bistable B2 receives G2 output and its Q output is received by AND gate G3. The other input of G3 receives the output from AND gate G1 via divide by two circuit D1. The output of G3 is received by preset counter C3. C3 output is received by bistable B3 and also fed back to the clear input of bistable B2. Bistable B3 output is received by AND gate G4 which feeds preset counter C4. The output of C4 is received by a bistable B4 and also fed back to clear input of B3. The Q output of bistable B4 is received by AND gate G5. The G5 output feeds preset counter C5 and the output of C5 is fed back to the clear input of bistable B4.

A first in first out memory FM1 receives Write pulses from the output of OR gate G2 and Read pulses from AND gate G5 via a preset counter C6. The output from GM1 is received by parallel-to-serial converter PS1 which means clock pulses from G5 output and load pulses from counter C6 output. The serial data output is connected to one input of selector gate G6.

A second parallel to serial converter PS2 is provided which receives auxiliary data and the output from sync pattern store SP1. Load pulses are provided from OR gate G2 output and clock pulses from AND gate G4 output. The serial output of PS2 is received from the other input of selector gate G6. Control input A of gate G6 receives the Q output of bistable B3. Control input B of gate G6 receives the Q output of bistable B4. The output of G6 is fed to Miller Coder MC1 which is clocked from the input received at gate G1. The coder output is received by one input of AND gate G7 which receives the $\bar{Q}$ output of bistable B2 via delay DL1. The serial data output is provided by the output of AND gate G7.

For the bistables B1–B4, a pulse on the PRT input will cause the output Q to take up the 1 state and the output $\bar{Q}$ to take up the 0 state. A pulse on the CLR input will cause Q to take up the 0 state and $\bar{Q}$ to take up the 1 state.

For the AND gates G1, G3, G4, G5 and G7, a 1 state on both inputs causes the output to take up the 1 state. The "0" output will be 0 for all other combinations of inputs.

For OR gate G2, a pulse on either input will generate a pulse on the output.

The selector gate G6 obeys the following rules

| Control Inputs | | Output |
|---|---|---|
| A | B | |
| 0 | 0 | 1 |
| 0 | 1 | As input 1 |
| 1 | 0 | As input 2 |
| 1 | 1 | 0 |

The counter C6 generates an output pulse coincident with the first input pulse, the N + 1th pulse, 2N + 1th pulse, etc.

The output frequency of divide by two circuit D1 is half the input frequency.

For the preset counters C1 to C5, one pulse is generated at the output after the input has received N pulses, where N is the number show for each counter block in FIG. 3. The process is cyclic, i.e. after 2N pulses have been received, the output will generate a second pulse, etc.

For PS1 and PS2, the word presented to the parallel inputs is loaded into the converter when the load terminal is pulsed. Each time the clock terminal is pulsed, the word in the converter is shifted to the right by one bit. The righthand bit in the converter is connected to the serial output. In the 24 bit mode PS2 has a length of 40 bits. In the 16 bit mode PS2 has a length of 24 bits.

The First in First Out memory FM1 has the property that the first input word written into the memory when the write terminal is pulsed will appear on the output when the read teminal is pulsed. A sequence of words written into the memory by successive write pulses will appear in the same order when read out by successive read pulses.

The sync pattern store SP1 is a fixed (read only) store. In the 24 bit mode it presents the following bit pattern to the 36 righthand data terminals of PS2

| LHS | RHS |
|---|---|
| 11110100010111111111010001011111111 | |

In the 16 bit mode the following data pattern is presented to the 20 righthand data terminals of PS2

| LHS | RHS |
|---|---|
| 1111010001011111111 | |

The Miller coder element in the block diagram converts a serial NRZ (non return to zero) data stream to a delay modulated or Miller coded serial data stream.

Delay element DL1 is a digital delay having the same number of bit periods delay as the Miller coder.

OPERATING SEQUENCE

1. Starting Conditions

It is assumed that at the start of operations all bistables B1 to B4 are in the clear state, that is to say $\overline{Q}$ is in the 1 state and Q is in the 0 state; also all counters are cleared, that is to say they will count the stated number of input pulses before generating the first output pulse. Furthermore, the FIFO is cleared of all data.

These conditions are set by means of a signal from the bistable B1 when it is in the clear state, i.e. $\overline{Q}$ is 1 or Q is 0. The signal paths that achieve this function are not shown on the block diagram to avoid confusion.

When the starting condition is present, i.e. when B1 is clear, the bistables B3 and B4 will be clear causing the inputs of A and B of G6 to be forced to the 0 state. Reference to the truth table for G6 (see above) shows that the output of G6 will take up the 1 state. This is applied to the Miller coder, which produces a continuous stream of coded is at the output.

2. Operating Sequence (24 bit mode, differences that apply to the 16 bit mode are shown in brackets)

The sequence of operations is indicated by a pulse on the START input. This pulse comes from a source external to the system being described in known manner. The START pulse causes the bistables B1 and B2 to be set, (i.e. Q = 1, $\overline{Q}$ = 0) B2 is set by the START pulse passing through the gate G2 and pulsing its PRT terminal.

The 1 at the Q output of B1 allows the output of CP1 to pass through G1 and be applied to the input of counter C1 and divider D1.

Loading the Sync Register

The pulse at the output of G2 generated by the START input is applied to the load terminal of PS2. Thus causes the 4 bit auxiliary data and also the 36 (20) bit synchronisation data (from SP1) to be loaded into PS2. At this time, B3 is clear, i.e. Q = 0. The output of D1 is unable to pass through G4 and so no clock signals appear at the clock input of PS2. The data in this register will therefore remain static until B3 is set as described later.

Filling the Store

The counter C1 will produce one pulse at its output for every 51 (34) basic clock input cycles. Each pulse causes the 24 (16) bit input data to be written into the FIFO store. The pulses from the output of C1 are also presented to the external data source as data prompts to cause the external data source to supply a new data word after each store write cycle.

Generating the Gap

When B2 has been set by the start input, its $\overline{Q}$ output will go to a 0. This 0 will pass through the delay, and after a number of bit periods equal to the delay through the Miller coder will cause one input of G7 to go to 0. This will force the output of G7 to 0.

The 1 at the Q output of B2 allows the output of D1 to pass through G3 and be applied to the input of C3. After 8 input pulses, C3 will generate an output pulse. This output pulse is applied to the CLR input of B2 causing the Q output of B2 to go to 0 and the $\overline{Q}$ output of B2 to go to 1.

The 0 at the Q output of B2 will prevent further pulses from D1 passing through G3. The counter C3 has thus cycled through its 8 states and is back at starting conditions again.

The 1 at the $\overline{Q}$ output of B2 will pass through the delay and after the delay period will appear on one input of G7 and allow the data from the Miller coder to pass to the output.

Generating the Synchronisation Sequence

The output of the counter C3 is also connected to the PRT input of the bistable B3. The pulse generated at the output of C3 at the end of the gap sequence, i.e. after 8 pulses at G3 output, also sets B3 by pulsing the PRT input. The Q output of B3 goes to 1 enabling the output of D1 to pass to the input of the counter C4 via gate G4.

The output of G4 also drives the clock input of PS2. For each pulse on the output of D1 the synchronisation word and auxiliary data that was loaded into PS2 by the start pulse will be shifted to the right one place. Thus a serial data stream in NRZ (Non Return to zero) form will be presented to input 2 of the selector gate G6.

During this part of the sequence, the Q output of B3 is 1 and the Q output of B4 os 0. G6 will therefore reproduce input 2 at its output. The serial NRZ synchronisation word and auxiliary data thus appears at the input to the Miller coder, is converted to Miller form, passes through G7 to the output.

The counter C4 receives the output of G4 at its input. After 40 (24) pulses have been applied to the input of C4, a pulse will be generated at C4 output. This pulse is applied to B3 CLR input and causes the bistable B3 to be cleared, setting the Q output to 0. The 0 at the Q output of B3 disables G4 and prevents further pulses from D1 from reaching C4 input and PS2 clock input.

During the time that B3 was set, i.e. Q = 1, 40 (24) clock pulses are applied to PS2 via G4. Thus all 40 (24) bits of data that were loaded into PS2 will have been shifted to the output and passed via G6, the Miller coder and G7 to the output. The counter C4 will have counted 40 (24) pulses and is therefore back at its starting condition.

Serialising 32 words of data

The output of counter C4 is also connected to the PRT input of B4. The pulse generated at the output of C4 at the end of the synchronisation sequence, i.e. after 40 (24) pulses at G4 output, also sets B4 by pulsing the PRT input. The Q output of B4 goes to 1 enabling the output of D1 to pass via gate G5 to counter C5, counter C6 and the clock input of PS1.

At this point B3 is clear and B4 is set. The A input of G6 will therefore be at 0, or the B input at 1. The selector gate will be in the condition that connects input 1 to the output.

The first pulse at the output of G5 will cause a pulse to be output by C6. This will pulse the read terminal of the FIFO store and the load terminal of PS1, causing the first word stored in the FIFO to be read out and loaded into PS1. The data bit that was loaded into the RH end of PS1 will appear at the output and will be connected to the input of the Miller coder via G6. The next 23 (15) pulses from G5 output will cause the remaining data to be serialised into NRZ form and presented to the Miller coder. Every 24th (16th) pulse from G5 output will generate a pulse on C6 output, and read the next data word from the store, and load it into PS1.

This process will continue until C5 has accumulated 768 (512) pulses from G5. At this point a pulse will be generated at C5 output. C5 output is connected to the CLR input of B4 and therefore when the 768th (512th) pulse has been generated at G5, B4 will be cleared making B4 Q output 0.

The 0 form B4 Q output will disable G5 preventing any more output from D1 reaching C5, C6 and PS1 clock inputs.

At this point, C5 has accumulated 768 (512) pulses and is back in its starting condition, and C6 has accumulated 768 (512) pulses, has generated 32 pulses on its output and is back in the starting condition.

The Stuffing Period

B3 and B4 are now both clear, so inputs A and B of G6 are at 0. This causes the output to go to 1. The 1 is applied to the Miller coder which generates a continuous coded 1 output until a new sequence is initiated.

A new sequence will commence when B2 is set to generate a gap sequence. The time between the clearing of B4 and the setting of B2 depends on the value of the count in C1 as will be described later.

Restarting a New Block

At the start of a block, i.e. when B1 and B2 were set by the start pulse the basic clock is directed via G1 to the input of C1. The output controls the filling of the FIFO store as previously described.

The output of C1 also feeds C2. After C2 has accumulated 32 pulses from C1, it will generate an output pulse. This output pulse will go via G2 to the PRT input of B2, setting B2 and starting another sequence of gap, synchronisation word, plus auxiliary data and 32 data words.

It will be seen that 32 write pulses are generated per block under the control of C1, and 32 read pulses are generated under the control of C5 and C6. At the start of the block, during the gap generation and synchronisation process, data is written into the store but not read out. At the end of the gap generation and synchronisation phase C3 and C4 will have accumulated 48 (32) pulses in total. C1 will have accumulated 96 (64) pulses (because it is driven at twice the rate of C3 or C4). Thus the store will contain one word and will be about to receive another.

At the end of the block the store will have received an equal number of read and write pulses and will be empty.

3. In the system described, the two sets of counters, C1 and C2, and C3 and C4 and C5 receive an equal number of basic clock pulses per block Example: $C1 \times C2 = 51 \times 32 = 1632$ $(C3 + C4 + C5) \times D1 = (8 + 40 + 768) \times 2 = 1632$ In this case there will be no stuffing period as B2 will be set as soon as B4 has cleared.

Multi track systems having one parallel input and many serial outputs may be realised by repeating the block diagram described once per serial output required. The data could be fed to each of the parallel inputs in rotation. In such a system the basic clock frequency must be a large multiple of the bit rate if an exact relationship between the number of bits per block, and the number of data prompt pulses per block is to be retained.

For example, if 14 outputs are to be generated, there must be $32 \times 14 = 448$ data prompts per block. In the 24 bit format there are 816 bits per block. The lowest common multiple of 816 and 448 is 22848. This implies that a basic clock frequency of $22848 - 816$, i.e. $28 \times$ bit rate would be required for such a system. Such a requirement is frequently impractical as it implies operating frequencies out of the range of available technology.

By inserting stuffing pulses the LCM of the number of prompts and number of bits per block may be reduced. This also allows a common basic clock frequency to be applied to all possible numbers of outputs within a required range.

For instance, in the 14 track, 24 bit case, by inserting 24 stuffing bits between blocks the common clock frequency is reduced to 8 times bit rate.

Figure 4:
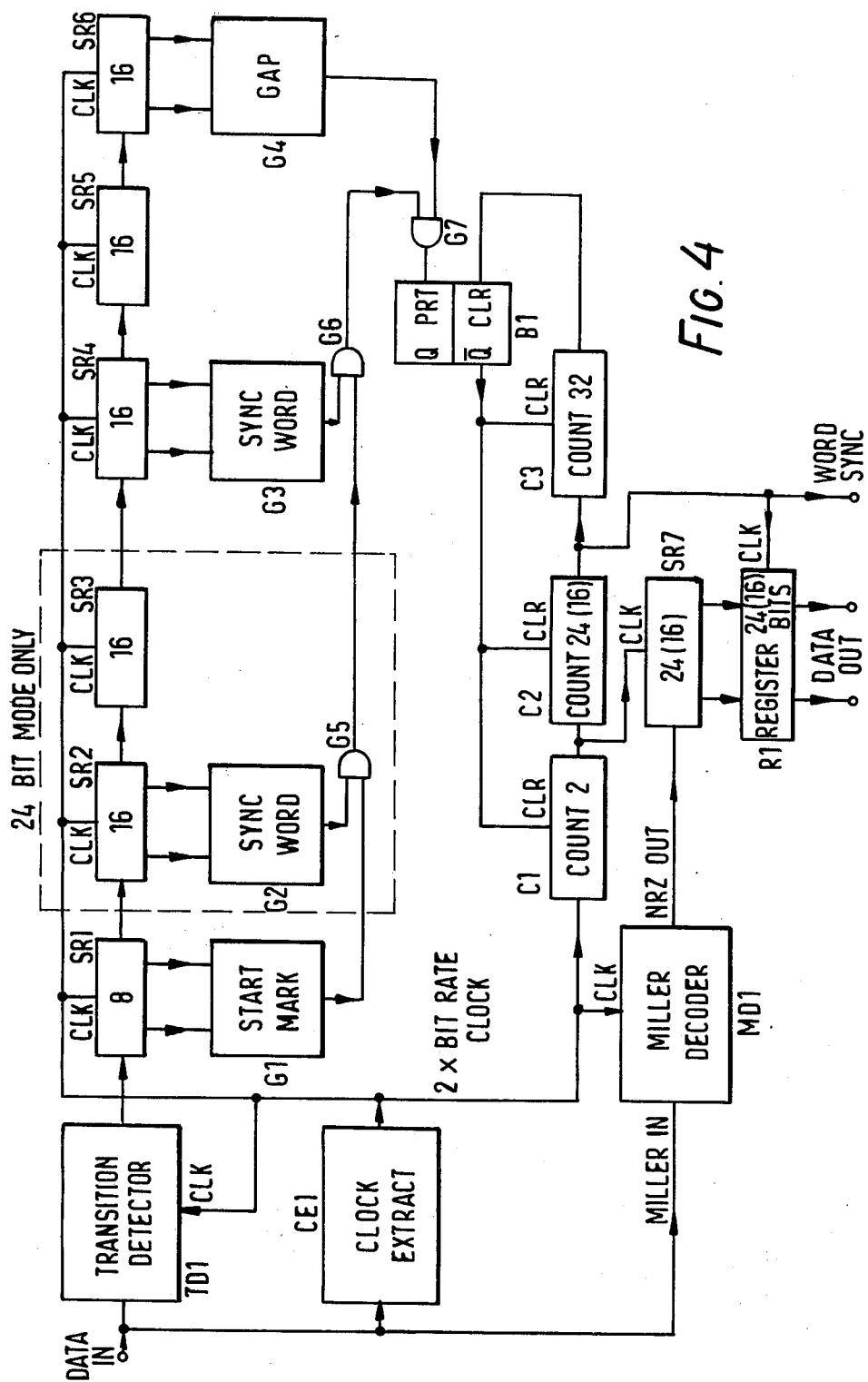
FIG. 4 shows an arrangement for receiving and processing data which contains the novel synchronising sequence.

An arrangement for receiving and decoding the data containing the synchronising sequence when retrieved from the storage medium is shown in FIG. 4.

The incoming data is received by a transition detector TD1 and by clock extractor CE1. Extractor CE1 extracts a reference clock from the incoming Miller coded serial data stream of $2 \times$ NRZ bit rate. Detector TD1 receiving the incoming Miller coded serial data stream is clocked at the $2 \times$ bit rate from CE1. A transition of state in the incoming data will cause the output of TD1 to be set to 1 for 1 clock period.

The output of TD1 is received by shift register block SR1 which has further register blocks SR2–6 connected in series thereto. Sr1 is a shift register having 8 shift stages. It has a serial input, a serial output and 8 parallel outputs corresponding to the 8 stages of the shift register. SR2 and SR4 are shift registers having 16 stages. Each register has a serial input, a serial output and 16 parallel outputs corresponding to the 16 shift stages.

SR3 and SR5 are serial shift registers having 16 shift stages, a serial input and a serial output.

SR6 is a shift register with a serial input and 16 parallel outputs corresponding to the 16 shift stages. In all the registers SR1 to SR6, the data is the register moves to the right one place each time a clock pulse is applied to the clock terminal of each register from CE1.

The parallel outputs of register SR1 are received by pattern recognition gate G1. The logic output of G1 will be 1 when the pattern 10101010 appears at the 8 input terminals. This pattern corresponds to the Miller encoded start mark after it is passed through the transition detector and has been shifted into SR1.

The parallel outputs of registers SR2, SR4 and SR6 are received in similar manner by pattern recognition gates G2, G3 and G4 respectively. However, each of these latter gates G2, G3 and G4 have 16 inputs and have a majority voting characteristic. If a pre-set number of these inputs corresponds to the pattern set into the gate, the output will go to 1. The vote level, i.e. the number of inputs that must correspond to the set pattern may be varied between 10 and 16. G2 and G3 recognise the pattern 1000100101001000. This corresponds to the Miller encoded synchronisation word after it has passed through the transition detector. G4 recognises the pattern 0000000000000000. This corresponds to the gap after it has passed through the transition detector.

The output of G1 and G2 are each received by one input of AND gate G5. The output of G5 is received by one input of AND gate G6 which has its other input connected to the output of gate G3. The output of G6 is received by one input of AND gate G7 which receives the output of gate G4 at its other input.

For AND gates G5-G7, a 1 state on both inputs causes the output to take up the 1 state. The output will be 0 for all other combinations of input.

The output of AND gate G7 is received by the PRT input of a bistable B1. The CLR input of bistable B1 is connected to the output of preset counter C3 which counter is series connected with the preset counters C2 and C1. Counter C1 receives the 2 × bit clock rate pulses from CE1. The CLR input for counters C1, C2 and C3 is controlled by the Q output of B1. A pulse on the PRT input of B1 will cause the output Q to take up the 1 state and the output $\bar{Q}$ to take up the 0 state. A pulse on the CLR input will cause Q to take up the 0 state and $\bar{Q}$ to take up the 1 state.

For C1, C2 or C3, one pulse is generated at the output after the input has received N pulses, where N is the number stated inside the box. The process is cyclic, i.e. after two N pulses have been received the output will generate a second pulse etc. A 1 level applied to the CLR terminal causes the counter to be reset and to be held in the reset state. Once the reset signal has gone to 0 the counter will always accumulate N pulses before generating an output pulse on the Nth pulse.

The incoming data is also received by a Miller decoder MD1 which decoder is clocked at the 2 × bit rate from CE1. The output of MD1 of the block diagram is a NRZ data stream identical to that provided at the input to the Miller encoder of FIG. 3.

The NRZ output from MD1 is received by a shift register SR7. Register SR7 has a serial input and 24 (16) stages. The data in this register is shifted to the right one place for each clock pulse applied to the CLOCK INPUT. The clock pulse for SR7 is derived from the output of counter C1. The parallel output of SR7 is received by register R1. The data at the 24 (16) input terminals is transferred to the 24 (16) output terminals when the clock terminal is pulsed. Register R1 is clocked by pulses derived from the output of counter C2. The output of counter C2 can also be used to provide word synchronisation externally of the arrangement of FIG. 4.

Operating Sequence

At the start of the operating sequence it is assumed that B1 is in the clear state. The output Q will be at 0 and the output $\bar{Q}$ will be at 1. The 1 from the $\bar{Q}$ output is applied to the CLR terminals of C1, C2 and C3 and resets these counters and holds them in the reset state.

The 2 × bit rate clock extracted from the data causes the output of the transition detector to be shifted into the chain of shift registers SR1 to SR6. It will be seen that the number of stages in this register chain corresponds to the number of possible transitions in the synchronisation sequence. The gates G1 to G4 connected to the outputs of the various registers are arranged so that their recognition pattern corresponds to the pattern of transitions in the synchronisation sequence added to the original data as described above.

The data from the transition detector will continue to shift through the registers until the synchronisation sequence lies exactly within the register chain. At this point the following conditions will exist.

(a) The output of G1 will be 1 if the pattern corresponding to a start mark lies in SR1.
(b) The outputs of G2 and G3 will be a 1 if the pattern in SR2 and SR4 corresponds to that expected from the synchronisation words. These outputs are tolerant of a preset number of missing or additional transitions.
(c) The output of G4 will be a 1 if less than the preselected number of 1's are present in SR6.

The 1 from G1 and the 1 from G2 will cause the output of G5 to go to 1. The 1 from G5 and the 1 from G3 will cause the output of G6 to go to 1. The 1 from G6 and the 1 from G4 will cause the output from G7 to go to 1 and pass the PRT of B1.

The timing of the system is arranged so that if a sufficiently correct version of the synchronisation sequence is present in the register chain SR1 to SR6, the bistable B1 will be set at a point in time when the first bit of the 32 data words in the data block is present at the output of the Miller decoder.

When B1 is set the clear inputs of C1, C2 and C3 to go 1 enabling these counters to accumulate pulses. For every second 2 × bit rate clock cycle a pulse will appear (i.e. at bit rate) at the output of C1 and pulse the clock terminal of SR7 causing the NRZ data from the Miller decoder to be shifted into SR7. After 24 (16) shifts have taken place C2 will generate an output pulse and cause the data currently lying in SR7 to be transferred to the output of R1.

Each time a pulse appears at the output of C2, external word synchronisation is provided to allow an external data acquisition system (not shown) to store or further process the data as required.

When the counter C3 has accumulated 32 pulses from the output of the counter C2 it will generate an output pulse and clear the bistable B1. This corresponds to the point at which 32 data words have been decoded from the data block and transferred via the register R1 to an external data acquisition system. The 1 output from the $\bar{Q}$ of B1 will reset counters C1 to C3.

When the synchronisation pattern from the next block lies in the register chain SR1 to SR6, the gating chain G5, G6 and G7 will cause a pulse to be applied to the PRT input of B1 and the next block will be decoded as previously described.

Errors in the synchronisation pattern which lie outside the allowable majority voting of the pattern recognition gates as described above will prevent a pulse being applied to the PRT input of B1, so that counters C1, C2 and C3 will still be held in the reset state and shift register SR7 and register R1 will not receive further clocks from C1 and C2 respectively.

I claim:

1. Apparatus for inserting synchronising data between blocks of serial data, said apparatus comprising:
   (a) synchronising data generating means for producing a predetermined data sequence;

(b) selector means connected to said data generator and an input receiving said serial data for selecting either said serial data or said synchronising data;

(c) coding means connected to said selector means for encoding both said serial data and said synchronising data, and (d) control means connected to an output of said coding means for producing an identification gap of a length equivalent to N bits of data before the start of the synchronising data whereby the signal produced at an output of said control means comprises a data gap followed by said synchronising data and said serial data.

2. Apparatus according to claim 1, wherein said synchronising generator comprises a store containing a specific data pattern in parallel form and a first parallel-to-serial converter for converting said serial pattern in said store into serial form to provide said predetermined data sequence.

3. Apparatus according to claim 2, including a memory for receiving incoming blocks of data in parallel form and a second parallel-to-serial converter for converting said data into serial form prior to the addition of said synchronising sequence.

4. Apparatus according to claim 1 wherein said coding means comprises a Miller coder provided between said selector means and said control means to convert said blocks of serial data and said synchronising sequence into Miller coded form and wherein said control means includes delay means to provide a delay for the identification gap corresponding to the inherent bit delay of said Miller circuit.

5. Apparatus according to claim 1, wherein said control means includes a counter having a capacity of 8 bits to provide an identification gap having a length of 8 bits.

6. Apparatus according to claim 2, wherein said store comprises a 20 bit store having an element pattern therein consisting of a first 8 bit block all set to logically high levels, a second 8 bit block the first 4 bits thereof being set to alternate high and low levels, the next two bits to low levels and the last two bits to high and low respectively, and a four bit block set to all logically high levels.

7. Apparatus according to claim 6, wherein said pattern from said store is read out from said store in sequence starting with said first block by said first parallel-to-serial converter and wherein said converter includes additional inputs to 4 auxiliary data bits to be added to the data from said store after conversion into serial form to provide a synchronising sequence of 24 bit length.

8. Apparatus according to claim 6, wherein between said first 8 bit block and said second 8 bit block there is provided 16 additional elements to provide an 8 bit block identical to said second block and an 8 bit block identical to said first block.

9. Apparatus according to claim 1, wherein means are provided to allow stuffing pulses to be added to said blocks of serial data prior to said identification gap.

10. A method of inserting synchronising data between blocks of serial data comprising:
(a) producing a predetermined synchronising data sequence;
(b) selecting either said serial data or said synchronising data;
(c) coding said selected serial data and synchronising data; and
(d) controlling said coded data to produce an identification gap in the data of a length equivalent to N bits of data before the start of the synchronising data which synchronising data is followed by said serial data.

11. A method according to claim 10, wherein the synchronising sequence comprises three blocks each of 8 bit length, the first 8 bit block being set to all logically high levels, the second 8 bit block having its first 4 bits in alternate highs and lows, the next 2 bits logically low levels and the last 2 bits in high and low respectively, and the third 8 bit block having the first 4 bits thereof in logically high level and the last 4 bits in a known but variable level sequence.

12. A method according to claim 11, wherein a further 16 bit sequence is provided between said first 8 bit block and said second 8 bit block and comprising an 8 bit block identical to said second block and an 8 bit block identical to said first block.

13. Apparatus for retrieving blocks of serial data from data containing synchronising data and comprising:
(a) synchronising data detection means for detecting a predetermined encoded data sequence and an identification gap of a length equivalent to N bits of data;
(b) extractor means for separating said data blocks from said synchronising data; and
(c) control means for controlling said extractor means to inhibit extraction of said data if the synchronising data detected is of an incorrect sequence.

14. Apparatus according to claim 13, wherein said data detection means comprises a detector and a plurality of register stages each for receiving a detected block of synchronising data and gating means connected to at least some of said registers to determine the logic levels within said registers and to provide a signal when said predetermined sequence is detected.

15. Apparatus according to claim 14, wherein at least some of said gating means are of a majority voting form to allow said signal to be produced when a substantially correct sequence is detected.

16. Apparatus according to claim 14, wherein said gating means comprises a first gate for detecting an identification gap corresponding to a length of 8 bits, a second gate for detecting a sequence corresponding to an 8 bit block, the first 4 bits thereof being alternate high and low levels, the next two bits being low levels and the last two bits being high and low levels respectively, and a third gate for detecting a sequence corresponding to 4 bits all at high level.

17. Apparatus according to claim 16, wherein a register block is provided between the registers connected to said first and second gates to provide storage of an 8 bit sequence not detected by any gate.

18. Apparatus according to claim 16, wherein a fourth date is provided between said second and third gates to detect a sequence corresponding to an 8 bit block having a data pattern identical to that detected by said second gate and wherein a further register block is provided between said fourth gate and said third gate to provide storage of an 8 bit sequence not detected by any gate.

19. Apparatus according to claim 13, wherein said extractor means includes a Miller decoder to convert incoming data in Miller form into a non return to zero serial binary form data, and output register means for receiving said serial data and converting into parallel form.

20. Apparatus according to claim 19, wherein said control means includes sensing means for detecting the presence of signals from all of said gates and counter means for counting transitions on said incoming data to provide clock pulses for said output register.

21. A method of retrieving blocks of serial data from data containing synchronising data comprising:
(a) detecting the presence of an encoded data sequence in said synchronising data and an identification gap having a length equivalent to N bits of data;
(b) extracting the data blocks from said incoming serial data; and
(c) controlling said data extraction to ensure that data is extracted only after a predetermined synchronising sequence has been detected.

22. A method according to claim 21, wherein said detected sequence includes an identification gap corresponding to a length of 8 bits, a first 8 bit block, a second 8 bit block, the first 4 bits thereof being alternate high and low levels, the next two bits being low levels and the last two bits being high and low levels respectively, and a third 4 bit block.

23. A method according to claim 22, wherein a fourth 8 bit block is provided between said second and third blocks and followed by a fifth 8 bit block having a sequence identical with said second block.

* * * * *